Patented Apr. 13, 1954

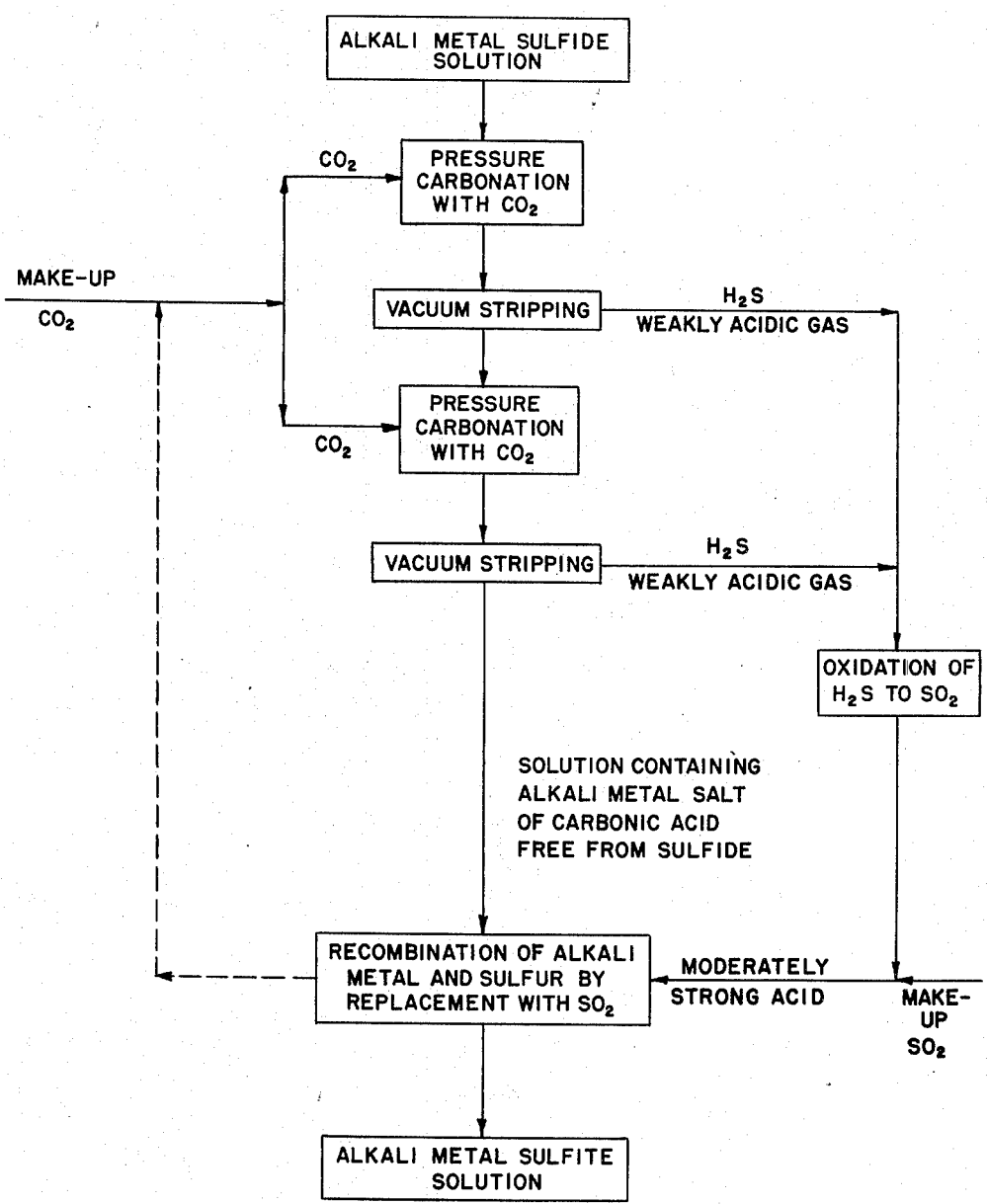

2,675,297

UNITED STATES PATENT OFFICE 2,675,297

SOLUTION PHASE PROCESS OF CONVERTING SODIUM SULFIDE INTO SODIUM SALTS OF CARBONIC ACID

Kenneth Russell Gray, Hartzell Lance Crosby, and John Charles Steinberg, Shelton, Wash., assignors to Rayonier Incorporated, Shelton, Wash., a corporation of Delaware Application June 7, 1950, Serial No. 166,682

7 Claims. (Cl. 23—63)

This invention relates to the treatment of aqueous solutions of sodium sulfide for conversion of the sulfides to salts of carbonic acid and the liberation of hydrogen sulfide.

The preparation of sodium sulfite or bisulfite by direct oxidation or reduction of other sodium-sulfur compounds has never been successfully accomplished since the reactions either do not proceed to completion or result in the formation of a complex mixture containing polysulfides, thiosulfate, polythionates or other undesirable by-products. This invention presents an efficient method of indirect oxidation of sodium sulfide whereby the soda and sulfur are separated temporarily by replacement of sulfide with carbonic acid permitting oxidation of the sulfur constituent, under controlled conditions, to sulfur dioxide ($SO_2$) which being relatively stable can be obtained without undesirable by-products. Recombination of $SO_2$ with the sodium by displacement of carbon dioxide, if desired, is readily effected to produce the sodium salts of sulfurous acid free from an excess of undesirable sulfur-containing contaminants such as sulfides, sulfur, thiosulfates, polythionates, etc.

Heretofore it has not been possible by means of a pressure carbonation treatment to convert sodium sulfide in aqueous solution completely into sodium salts of carbonic acid and to recover hydrogen sulfide in concentrated form. Our invention is based on the discovery that sodium sulfide in aqueous solution may be readily converted to sodium salts of carbonic acid by subjecting the solution to a plurality of pressure carbonation treatments, preferably at an elevated temperature, each pressure carbonation being followed by vacuum stripping with steam or flashing into a vacuum. Under these conditions the conversion of sodium sulfide into sodium salts of carbonic acid is substantially complete, and substantially all of the hydrogen sulfide is recovered in concentrated form. The invention comprises two or more carbonation treatments of a solution containing sodium sulfide with gaseous carbon dioxide or with a carbon dioxide containing gas, with alternate treatment of the solution under vacuum with steam for the removal of the hydrogen sulfide in relatively high concentration.

Another embodiment makes possible the use of diluted carbon dioxide without loss of $H_2S$ in dilute form. This involves contacting the solution with the dilute carbon dioxide in a countercurrent manner in the pressure carbonation treatments.

As used herein, the term "stripping with steam" or "steam stripping" refers to the removal of dissolved gas by contacting the solution with steam. While steam stripping is generally accomplished by the contacting of a solution under vacuum in a countercurrent manner with steam supplied from an external source, it is understood that stripping can also be accomplished by the steam generated by "flashing" i. e., the release of pressure on a solution previously heated to a suitable elevated temperature.

In the practice of our invention, while we prefer to use countercurrent steam stripping under vacuum, it is understood that in such operation stripping by flashing will also occur as the hot solution under pressure enters the vacuum stripping column.

The substantially complete conversion of sodium sulfide to sodium salts of carbonic acid is obtained by an all solution phase process. This simplifies continuous operation and control of the process and eliminates costly precipitation or crystallization operations and attendant filtering, centrifuging, washing, etc.

The process of our invention is of great value since it provides a practical method for effecting complete carbonation of sodium sulfide solutions with carbon dioxide, with simultaneous recovery of hydrogen sulfide at high concentration. One important feature contributing to this successful result is the division of the operation into a number of specific steps rather than attempting to carry it out as a single operation as in prior impractical proposals. Our process effects the conversion of a sodium sulfide-containing solution to sodium carbonate in a series of "stages," at least two, each stage consisting of a pressure carbonation step followed by a steam-stripping step to remove volatile hydrogen sulfide from the solution.

The sodium carbonate (or bicarbonate) produced by our process may be used as such, or if desired it may be either converted to caustic soda by causticizing with lime or it may be converted to sodium sulfite or bisulfite by a "sulfiting" treatment. As used herein, sulfiting means the treatment of a solution of sodium salts or carbonic acid with $SO_2$, either gaseous or dissolved in water, to form the corresponding sulfite or bisulfite, depending on the conditions of and extent of the sulfiting treatment.

In one of its important aspects the invention provides for the conversion of the carbonate to a sulfite or bisulfite and the process of our invention may be considered as an indirect oxidation process whereby sulfide is converted to sulfite. Thus, the solution carbonation process serves to separate the sulfur temporarily from the base so that the sulfide sulfur (in the form of $H_2S$) may be completely oxidized in a gaseous state to a stage corresponding to sulfite without the formation of undesirable by-products. Following oxidation, the sulfur (in the form of $SO_2$), is recombined with the base to produce sodium sulfite or bisulfite.

While the exact nature of the reactions involved is not completely understood the following may serve as a possible explanation.

a. Carbonation

Treatment with carbon dioxide under pressure in the carbonation steps serves to give an equilibrium mixture consisting largely of $NaHCO_3$ and $NaHS$, with smaller amounts of free, dissolved $H_2S$. This reaction involving sulfur may be represented by Equations 1 and 2.

PRINCIPAL REACTION

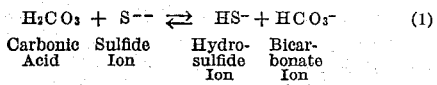

SECONDARY REACTION TO LESSER EXTENT

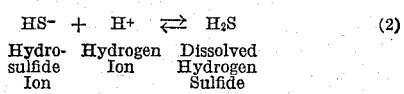

In addition to the above, if sodium carbonate be present originally in the sodium sulfide solution, it will be converted in substantial amount to sodium bicarbonate:

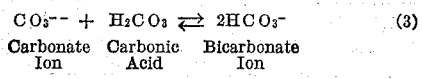

Bicarbonate from both Equations 1 and 3 serves to promote removal of hydrogen sulfide in the subsequent stripping operation.

Use of pressure in the carbonation step facilitates the formation of the desired equilibrium mixture probably due to the fact that pressure increases the absorption of $CO_2$ and therefore increases the concentration of $H_2CO_3$ in the solution.

Use of high pressure, however, does not permit complete carbonation in one operation (in the absence of simultaneous stripping), probably because of:

(a) The inhibiting presence of the reaction products, $H_2S$ and $NaHS$, and (b) The difficulty of proceeding to any substantial degree past the $NaHS$ stage in view of the weakly acidic nature of $H_2CO_3$.

Restriction of carbon dioxide added per stage

The use of flue gas as the carbonating agent in a vented carbonation tower would result in considerable evolution of dilute $H_2S$ in the effluent gas if more than about 1.2 equivalents of $CO_2$ per equivalent of sulfide were absorbed in the first carbonation.

Even when using pure $CO_2$ in a substantially-closed chamber, there is a practical limit to the amount of carbon dioxide that can be added, in that the carbonation operation proceeds past the $NaHS$ stage only with difficulty. As a result of the substantially-closed system and the increased driving force, however, this limit is somewhat higher than that reached when using flue gas.

When using pure $CO_2$ in a closed chamber, there would be no object in attempting to add $CO_2$ in amounts appreciably beyond that necessary to convert the $Na_2S$ to $NaHS$ and all the $Na_2CO_3$ to $NaHCO_3$, since any such addition would result in undesirable dilution of the recovered $H_2S$ in the subsequent stripping step while still not achieving complete conversion in a single sequence of carbonation and stripping.

b. Stripping

The principal purpose of the stripping operation is to remove sulfur from the solution as volatile $H_2S$ and to recover as much as possible of the $H_2S$ from the much larger amount of $NaHS$ present. This causes the reaction equilibrium to shift toward completion as represented by the equation:

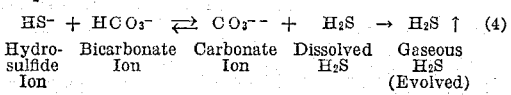

It would be theoretically possible to evolve carbon dioxide (simultaneously with the $H_2S$) through decomposition of bicarbonate by the reaction:

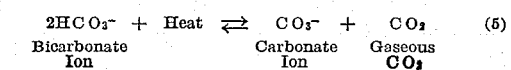

However, surprisingly, under the stripping conditions of the invention i. e., releasing the hot pressure carbonated solution into a vacuum, thus contacting it with steam at low temperature, very little bicarbonate decomposition occurs, with the result that the gas evolved is substantially hydrogen sulfide and water vapor. The latter may be readily condensed out leaving concentrated hydrogen sulfide.

Irrespective of whether pure $CO_2$ or flue gas is used for the carbonation, no attempt is made to completely strip the solution in the first stripping step for the following reasons:

(1) Due to the practical limitations previously mentioned, which require that carbonation be carried out in two (or more) stages, there would be no practical object in so doing.

(2) As the stripping operation approaches completion, the efficiency of stripping with regard to steam consumption decreases tremendously.

Thus, in the first stripping operation, it is not possible to effect complete sulfide elimination. We have discovered, however, that by carbonating a second time to shift the reaction equilibrium further toward completion with resulting increase in hydrogen ion concentration, substantially complete conversion may be readily and practically obtained with moderate steam usage in the second stripping.

Steam is used as the stripping agent since a recovery of concentrated hydrogen sulfide gas can be effected simply by condensing the steam from the effluent mixture of steam and hydrogen sulfide. Use of low pressure in stripping as applied to this operation is an important technical feature of our invention. Reduced pressure markedly improves the conversion and apparently reduces carbon dioxide losses from bicarbonate decomposition.

The accompanying drawing illustrates diagrammatically a flow sheet embodying the invention. Alkali metal sulfide from any suitable source may be used and any desired number of stages of carbonation may be used.

In the preferred form of our invention the sulfide-containing solution is subjected to at least two carbonation treatments in which the solution is treated preferably in a countercurrent manner, under pressure with a gas containing carbon dioxide, each such carbonation treatment being followed by steam stripping under a vacuum of from 5 to 29 inches of mercury, preferably at least 20 inches of mercury, to remove volatile hydrogen sulfide in concentrated form, whereby substantially all the sodium sulfide content of said solution is converted into sodium salts of carbonic acid. In this preferred method of operation the first carbonation treatment is generally effected at a temperature of 50–150° C. with a gas pressure of 20–165 lbs. per square inch absolute, such that the mol ratio of carbon dioxide absorbed to total titratable alkali in the solution is in the range of 0.6 to 1.2. The second carbonation treatment is effected at a temperature of 50–150° C. and a gas pressure within the range of 16–150 lbs. per square inch absolute such that the carbon dioxide absorbed is sufficient to permit during final stripping conversion of substantially all the sodium sulfide content of the solution to sodium salts of carbonic acid without exceeding the solubility limit of sodium bicarbonate in the solution. Generally using preferred conditions in the second carbonation, the mol ratio of carbon dioxide to total titratable alkali will be within the range of 0.3 to 0.7. In that carbonation is carried out at an elevated temperature, and that sodium bicarbonate is consumed in the reaction with sodium hydrosulfide in the stripping operation, relatively concentrated solutions of soda salts (e. g., of the order of 100 gm. per liter as $Na_2O$) may be treated without the formation of precipitates during processing.

The final product from the process will consist essentially of a solution containing both sodium carbonate and bicarbonate. Depending on the particular equipment used and the manner of operation, the relative proportions will vary from nearly pure carbonate to a carbonate-bicarbonate mixture approaching the solubility limits of the bicarbonate. In one particular example the product contained 75% carbonate and 25% bicabonate; such a mixture being quite satisfactory for use in the preparation of sulfites or bisulfites.

By "total titratable alkali" in the above is meant the basicity equivalent to a standard acid titration to the methyl orange end point. In the case of soda smelts this would include all of the sulfide, carbonate, and caustic soda, and one-half of the sulfite, and would exclude such salts as thiosulfate, sulfate, and chloride.

The carbonation and stripping operations may be carried out in any type of equipment conventionally employed for gas absorption or stripping operations. Thus, for the carbonation and stripping operations, we have used packed columns, plate columns, spray columns, and continuous liquid phase columns. Agitated gas dispersion equipment might be advantageously used for the carbonation stage.

The following table of experimental data illustrates a few of the advantages obtained through use of our invention in a two-stage operation:

TABLE

| Source of $CO_2$ | Amount of $CO_2$ Used, Mol $CO_2$/Mol TTA | Avg. Conc. of $H_2S$ Evolved, Vol. Percent | Sulfide Elimination, Percent | Thiosulfate Increase, Percent of TTA |
|---|---|---|---|---|
| Pure $CO_2$ | 1.5 | 92 | 99.2 | Negligible. |
| Flue Gas (18% $CO_2$) | 1.7 | ¹ 87 | 99.5 | 3.2. |

¹ 94% of the total $H_2S$ liberated at this concentration by steam stripping following each of two pressure carbonations employing countercurrent flow.

The carbon dioxide gas used in the carbonation process may be obtained from the best available source, as dictated by the economics of the process. We have obtained excellent results using pure carbon dioxide, such as can be purchased in cylinders or practically produced on a large scale by absorption-desorption processes using sodium carbonate or an alkanolamine absorbent, e. g., the liquid carbonic, or the Girbotol process.

Flue gas may be used to advantage, requiring only slightly higher operating pressures or larger equipment. Where a high degree of purity of the final product is desired, it may be advisable to purify the flue gas by removing suspended matter and scrubbing out any sulfur dioxide or other undesirable contaminant. Lime kiln gas, if available, may often be freed from suspended matter and used to advantage, since it will normally contain from 30 to 45% carbon dioxide.

In an integrated process where the carbonated product is sulfited to give sodium sulfite or bisulfite, diluted carbon dioxide is obtained as an overgas from the sulfiting operation in concentration proportional to the concentration of sulfur dioxide used for sulfiting. Carbon dioxide from this source may be obtained in sufficiently high concentration and sufficiently free from sulfur dioxide for use to supply a substantial portion of the carbon dioxide required for carbonation.

When using diluted carbon dioxide (e. g., flue gas, lime kiln gas or overgas from a sulfiting operation) in the pressure carbonations, countercurrent flow is advantageously used. Under these conditions the gas leaving the top of the carbonator is in contact with highly alkaline sodium sulfide solutions in the first carbonation, and a solution containing a higher proportion of sodium carbonate in any succeeding carbonations. Probably because of the high alkalinity at the point of gas exit, the amount of hydrogen sulfide leaving the top of the carbonator in dilute form is very low. As a result the preponderant portion of the total hydrogen sulfide produced is liberated in the stripping operations in highly concentrated, readily useable form (see the table).

Using pure carbon dioxide for carbonation, thiosulfate formation is negligible. Using diluted carbon dioxide containing oxygen (e. g., flue gas) some thiosulfate is formed but the amount is surprisingly low and the product sodium carbonate may be used without purification for many applications.

As used in this specification a "solution phase" process is defined to include any transient precipitates which may form but which can be handled in properly designed liquid processing equipment and which will redissolve during the process. Also, by "solution phase," we mean that the product being processed is in solution and that this does not preclude removal of relatively small amounts of insoluble impurities, dirt, etc. by filtration, sedimentation, etc.

We claim:

1. The solution phase process of converting sodium sulfide into sodium salts of carbonic acid and recovering hydrogen sulfide therefrom comprising subjecting a solution containing sodium sulfide to a plurality of carbonation treatments with gaseous carbon dioxide at an elevated temperature above 50° C. and under a pressure of at least 16 pounds per square inch absolute, each carbonation treatment being followed by steam stripping under a vacuum of from 5 to 29 inches of mercury to remove volatile hydrogen sulfide in concentrated form, whereby a solution is produced having an enhanced content of sodium salts of carbonic acid and substantially free from sulfide.

2. The process according to claim 1 in which the carbonation is at a temperature of from 50 to 150° C.

3. The process according to claim 1 in which diluted carbon dioxide is used and in which the solution and the gas containing carbon dioxide are passed in countercurrent.

4. The process according to claim 1 in which two carbonation and stripping operations are used in series, each carbonation operation being followed by a stripping operation.

5. The solution phase process of converting sodium sulfide into a solution of sodium salts of carbonic acid substantially free from sulfide and recovering hydrogen sulfide comprising subjecting a solution containing sodium sulfide to two carbonation treatments in which the solution is treated in a countercurrent manner under pressure with a gas consisting in part of carbon dioxide, each such carbonation treatment being followed by steam stripping under a vacuum of at least 20 inches mercury to remove volatile hydrogen sulfide in concentrated form, whereby sodium salts of carbonic acid are obtained as a solution substantially free from sulfide; in such process the first carbonation treatment being effected at a temperature of 50–150° C. with a gas pressure of 20–165 lbs. per square inch absolute such that the mol ratio of carbon dioxide absorbed to total titratable alkali is in the range of 0.6 to 1.2, the second carbonation treatment being effected at a temperature of 50–150° C. and a gas pressure within the range 16–150 lbs. per square inch absolute such that the ratio of carbon dioxide absorbed to total titratable alkali is within the range of 0.3 to 0.7.

6. The solution phase process of converting sodium sulfide into a solution of sodium salts of carbonic acid substantially free from sulfide and recovering hydrogen sulfide comprising subjecting a solution containing sodium sulfide to two carbonation treatments in which the solution is treated under pressure with carbon dioxide, each such carbonation treatment being followed by steam stripping under a vacuum of at least 20 inches mercury to remove volatile hydrogen sulfide in concentrated form, whereby sodium salts of carbonic acid are obtained as a solution substantially free from sulfide; in such process the first carbonation treatment being effected at a temperature of 50–150° C. with a gas pressure of 20–165 lbs. per square inch absolute such that the mol ratio of carbon dioxide absorbed to total titratable alkali is in the range of 0.6 to 1.2, the second carbonation treatment being effected at a temperature of 50–150° C. and a gas pressure within the range 16–150 lbs. per square inch absolute such that the ratio of carbon dioxide absorbed to total titratable alkali is within the range of 0.3–0.7.

7. The solution phase process of converting sodium sulfide into a solution of sodium salts of carbonic acid substantially free from sulfide and recovering hydrogen sulfide comprising subjecting a solution containing sodium sulfide to a plurality of carbonation treatments at an elevated temperature above 50° C. and under a pressure of from 16 to 165 pounds per square inch absolute with a gas consisting at least in part of carbon dioxide, following each such carbonation treatment said solution being flashed at a vacuum of at least 20 inches mercury, the temperature during the carbonation treatments being maintained substantially above the saturated steam temperature corresponding to the vacuum being used, whereupon flashing effects the removal of volatile hydrogen sulfide in concentrated form, whereby sodium salts of carbonic acid are obtained as a solution substantially free from sulfide.

References Cited in the file of this patent

UNITED STATES PATENTS

| Number | Name | Date |
|---|---|---|
| 403,248 | Chance et al. | May 14, 1889 |
| 1,983,789 | Bradley et al. | Dec. 11, 1934 |
| 2,094,070 | Hultman et al. | Sept. 28, 1937 |

FOREIGN PATENTS

| Number | Country | Date |
|---|---|---|
| 3,388 | Great Britain | of 1876 |